HIGH SPEED AUTOMATIC MOUNTING AND SEALING MACHINE

Filed Aug. 24, 1964 8 Sheets-Sheet 1

INVENTOR
OLEG J. OREBIC.
BY [signature]
ATTORNEY.

Jan. 3, 1967 O. J. OREBIC 3,295,183

HIGH SPEED AUTOMATIC MOUNTING AND SEALING MACHINE

Filed Aug. 24, 1964 8 Sheets-Sheet 2

INVENTOR.
OLEG J. OREBIC.
BY [signature]
ATTORNEY

Jan. 3, 1967 O. J. OREBIC 3,295,183

HIGH SPEED AUTOMATIC MOUNTING AND SEALING MACHINE

Filed Aug. 24, 1964 8 Sheets-Sheet 3

INVENTOR.
OLEG J. OREBIC.
BY [signature]
ATTORNEY

HIGH SPEED AUTOMATIC MOUNTING AND SEALING MACHINE
Filed Aug. 24, 1964 
FIG. 7.
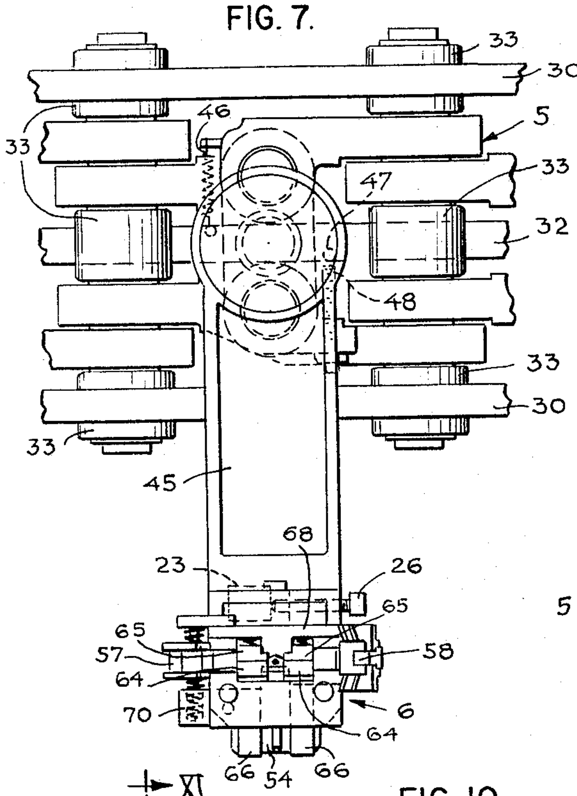
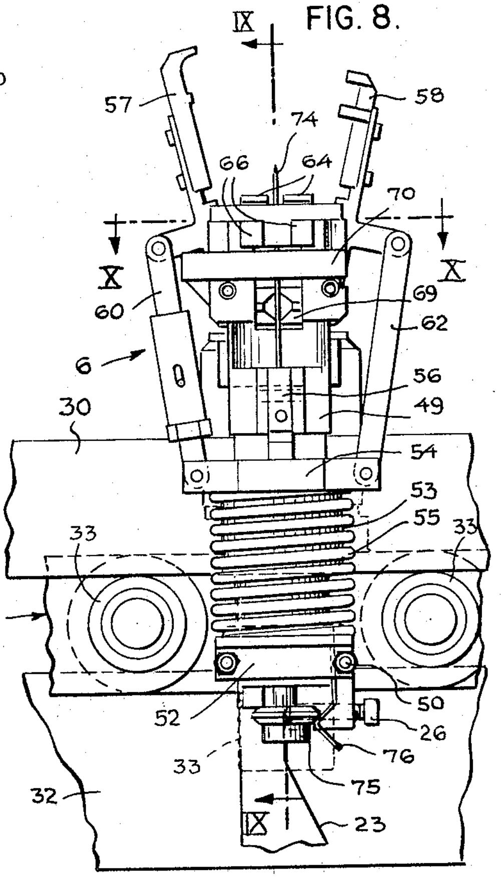
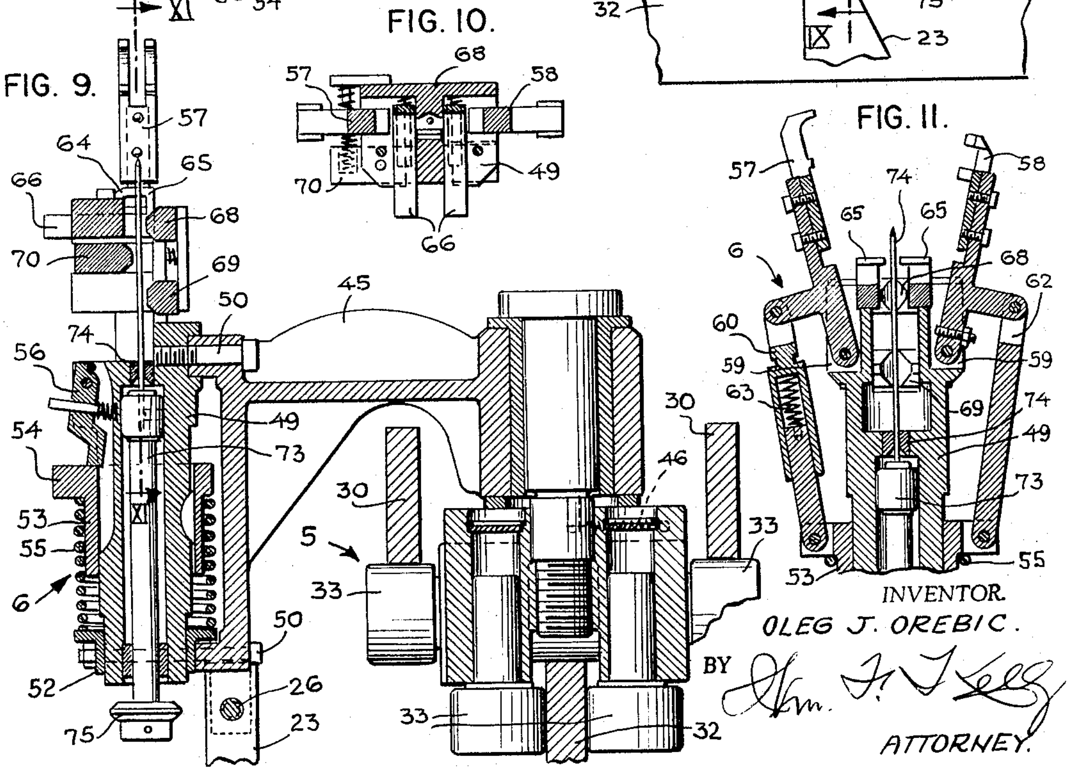
FIG. 9. FIG. 10. FIG. 11.
INVENTOR.
OLEG J. OREBIC.
BY [signature]
ATTORNEY.

HIGH SPEED AUTOMATIC MOUNTING AND SEALING MACHINE

Filed Aug. 24, 1964 8 Sheets-Sheet 5

INVENTOR.
OLEG J. OREBIC.
BY [signature]
ATTORNEY.

Jan. 3, 1967 O. J. OREBIC 3,295,183

HIGH SPEED AUTOMATIC MOUNTING AND SEALING MACHINE

Filed Aug. 24, 1964 8 Sheets-Sheet 6

INVENTOR.
OLEG J. OREBIC.

BY [signature]
ATTORNEY.

Jan. 3, 1967 O. J. OREBIC 3,295,183

HIGH SPEED AUTOMATIC MOUNTING AND SEALING MACHINE

Filed Aug. 24, 1964 8 Sheets-Sheet 7

INVENTOR.
OLEG J. OREBIC.
BY Wm. F. Kelly
ATTORNEY.

Jan. 3, 1967 O. J. OREBIC 3,295,183

HIGH SPEED AUTOMATIC MOUNTING AND SEALING MACHINE

Filed Aug. 24, 1964 8 Sheets-Sheet 8

INVENTOR.
OLEG J. OREBIC.

BY [signature]

ATTORNEY.

United States Patent Office 3,295,183
Patented Jan. 3, 1967

3,295,183
HIGH SPEED AUTOMATIC MOUNTING AND SEALING MACHINE

Oleg J. Orebic, Montclair, N.J., assignor to Westinghouse Electric Corporation, Pittsburgh, Pa., a corporation of Pennsylvania
Filed Aug. 24, 1964, Ser. No. 391,582
7 Claims. (Cl. 29—25.19)

Figure 1:
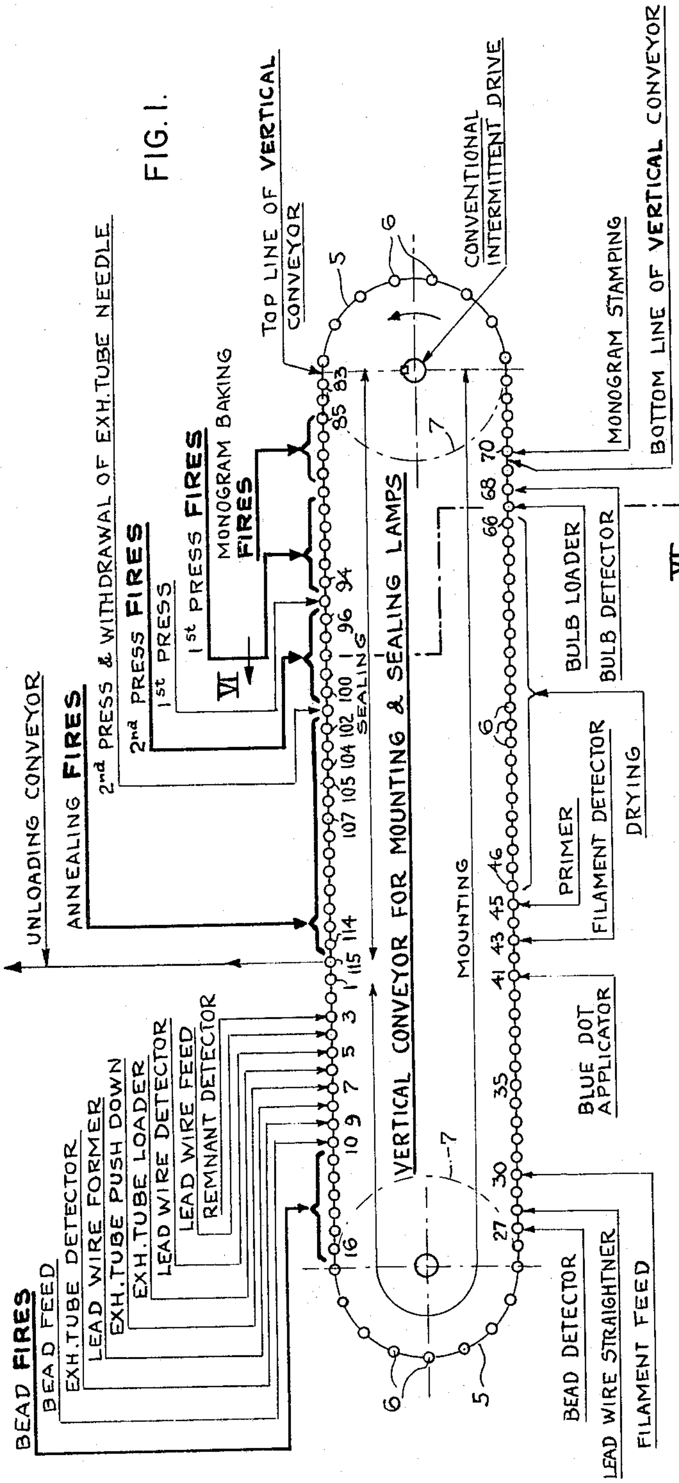

The present invention relates to a high speed automatic machine for the production of electric lamps and more particularly to a single machine which mounts and seals lamps on a vertical conveyor.

Heretofore in the art, the production of such lamps has required three separate machines for the respective operations of fabricating the stem, the mount, and thereafter sealing such mount to the envelope. This has been due to the fact that in the formation of the stem the various parts are assembled while held in a head and projecting in one direction to form the mount. Thereafter such stem is transferred by a conveyor to the mount machine where the filament is mounted to the lead wires after which an operator must take the mount from the mount machine and after inverting the mount insert it into the sealing machine. This means that alignment of the product changes four times during transfer and at each such transfer the possibility of a salvaged product is increased thus detrimentally effecting manufacturing costs.

Also at various indexed stations of both the mounting machine and the sealing machine hot flames produced by burners are required during fabrication. As a consequence considerable heating of the head itself along with other metallic parts of the machine and the inherent contraction and expansion therefrom too frequently caused variation in dimensions with misalignment and spacing of the assembled parts thus resulting in a defective product.

It is accordingly the primary object of the present invention to eliminate the inherent difficulties of the prior art by the provision of a high speed automatic mounting and sealing machine wherein all necessary operations are performed on the unitary machine in proper sequence thus eliminating the necessity of transferring the product from one machine to another and confining salvage thereof to a minimum.

Another object of the present invention is the provision of a unitary automatic mounting and sealing machine wherein the various parts are fed to and held by a single head during complete fabrication of the product so that misalignment of the parts during manufacture is completely eliminated.

Another object of the present invention is the elimination of the inherent difficulties of the prior art by the provision of a high speed automatic mounting and sealing machine wherein all required heating operations are performed at the top of the machine so that the lamp parts alone are heated thus keeping the machine parts themselves substantially at room temperature.

Another object of the present invention is the provision of a vertical high speed mounting and sealing machine wherein a single conveyor is utilized which indexes through a vertical plane to various work stations.

The foregoing objects of the present invention together with other objects which will become obvious to those skilled in the art from the following description are achieved by providing a unitary high speed automatic mounting and sealing machine employing a single conveyor chain which is intermittently movable through a vertical plane and along an upper and lower horizontal path. Such conveyor is provided with spaced universal mounting and sealing heads indexable to various work stations during movement in its vertical plane with all those work stations requiring heating fires being disposed at the top of the machine so that heating is confined more or less to the lamp parts themselves with the machine itself thus maintained substantially at room temperature during all lamp-making operations.

Figure 4:
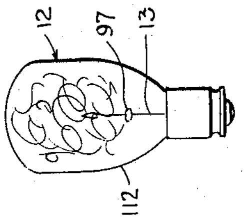
Figure 3:
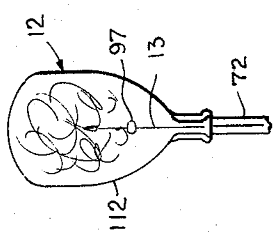
Figure 2:
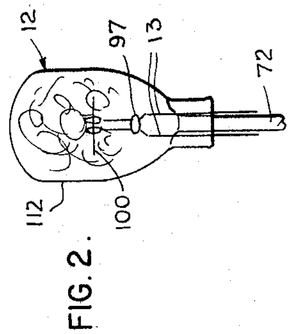
Figure 5:
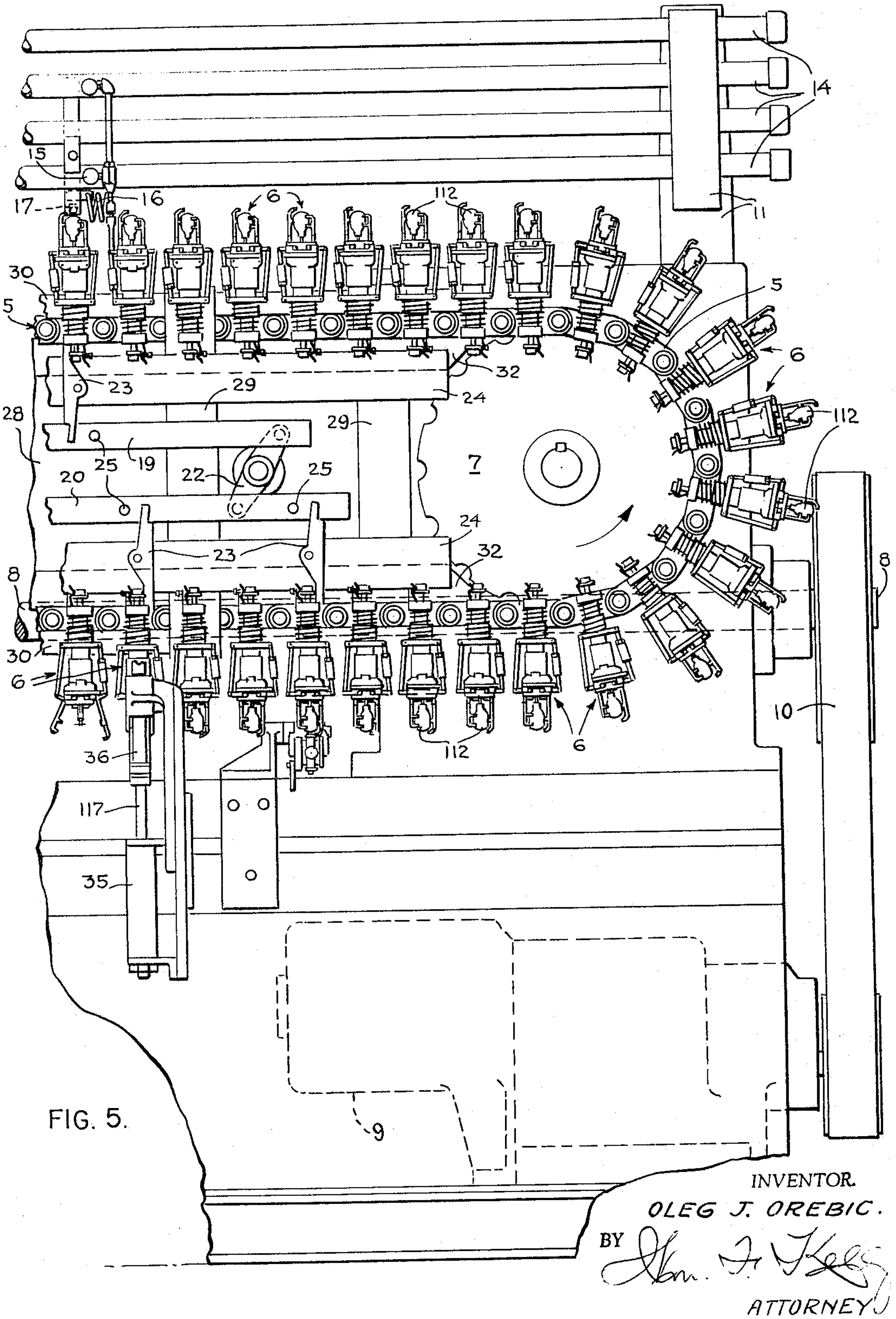
Figure 6:
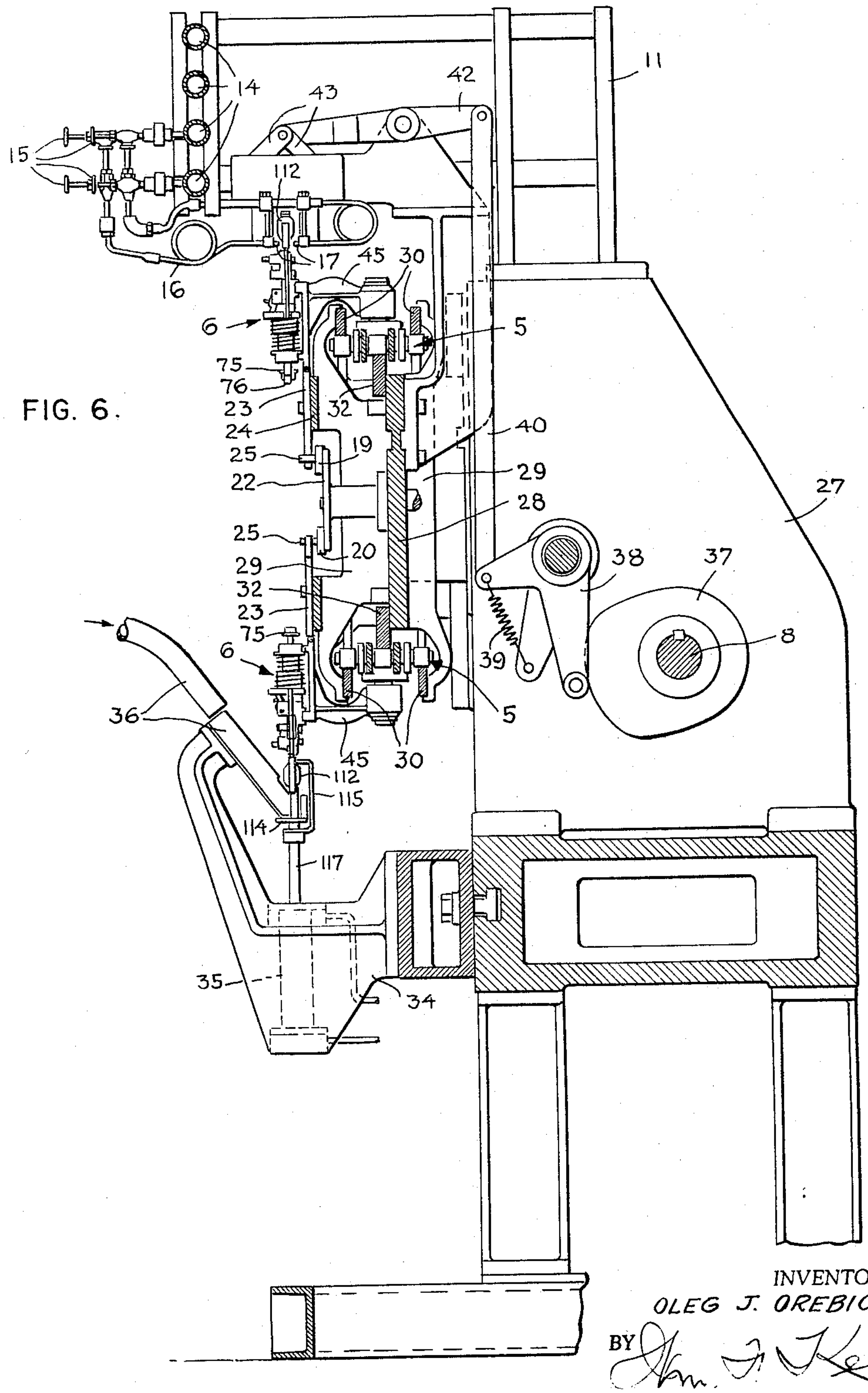
Figure 12:
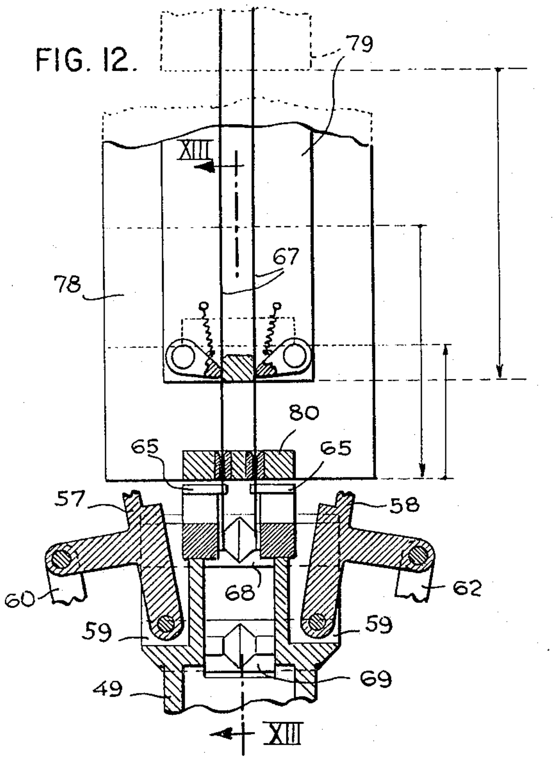
Figure 13:
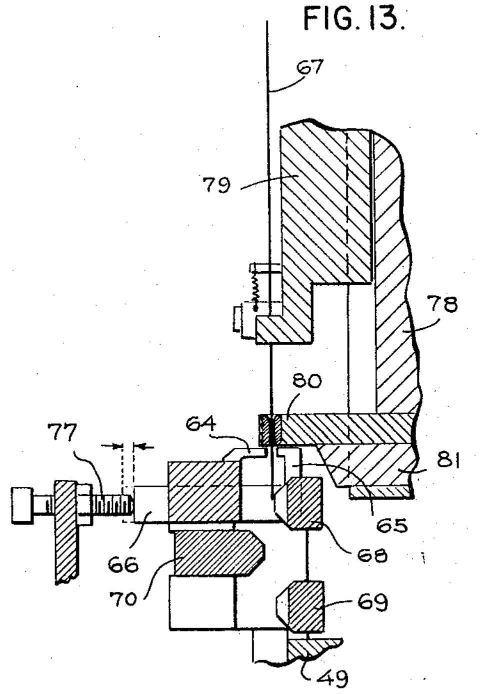
Figures 14, 15, 16:
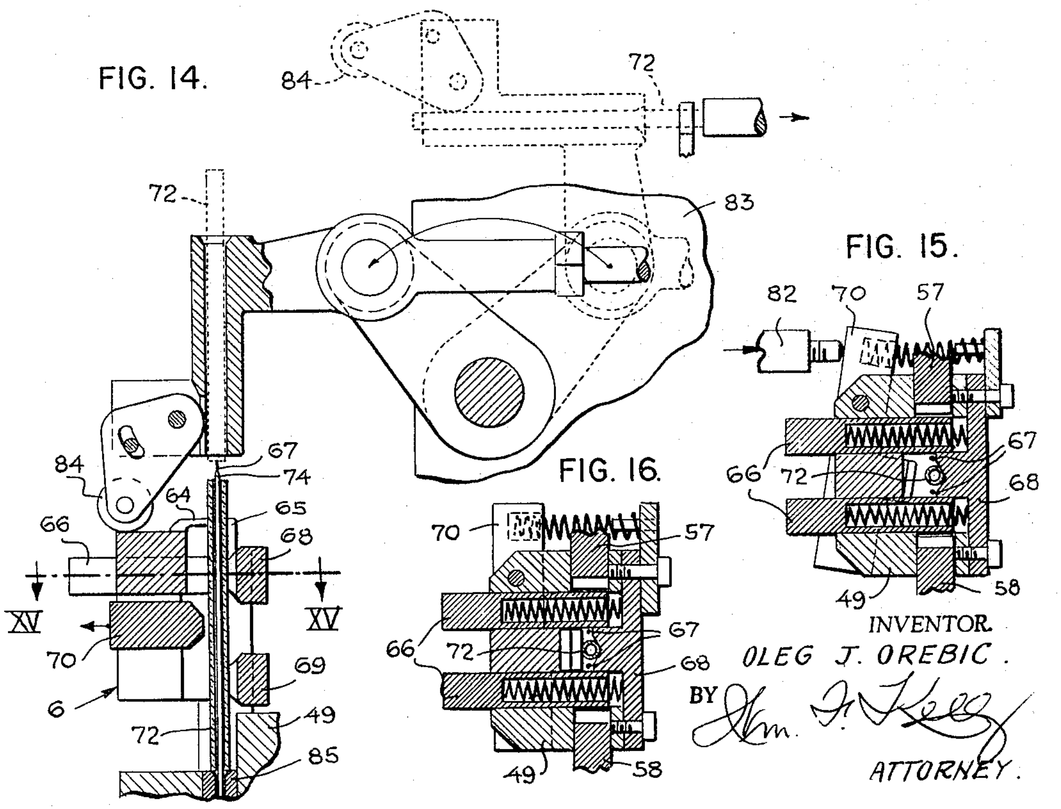
Figure 17:
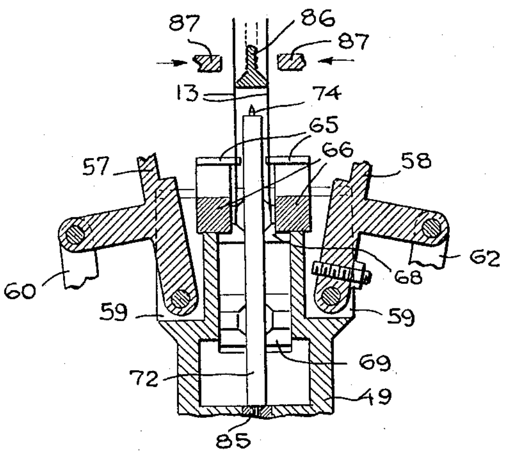
Figure 18:
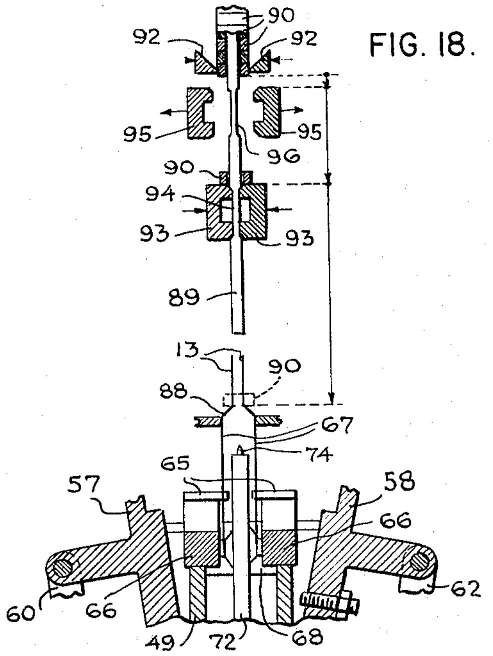
Figure 19:
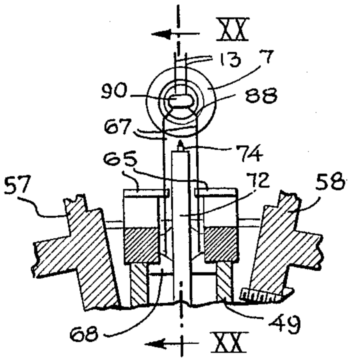
Figure 21:
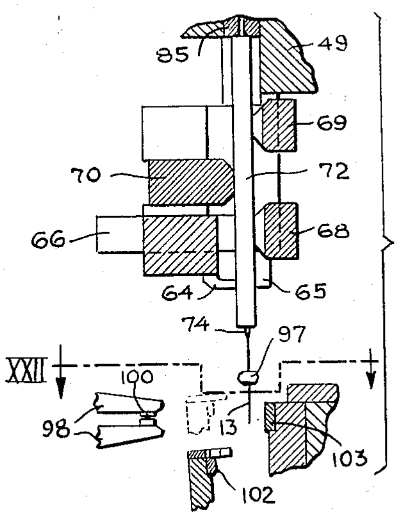
Figure 20:
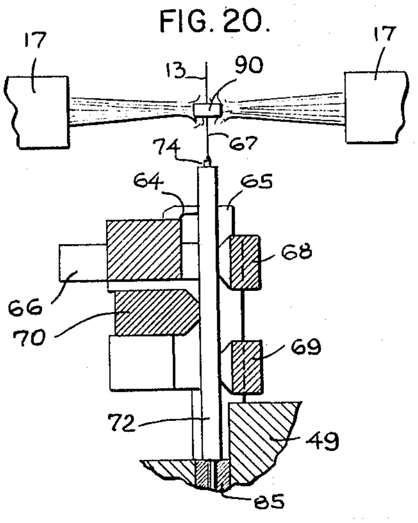
Figure 22:
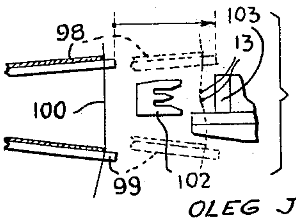
Figures 23, 24, 25, 26:
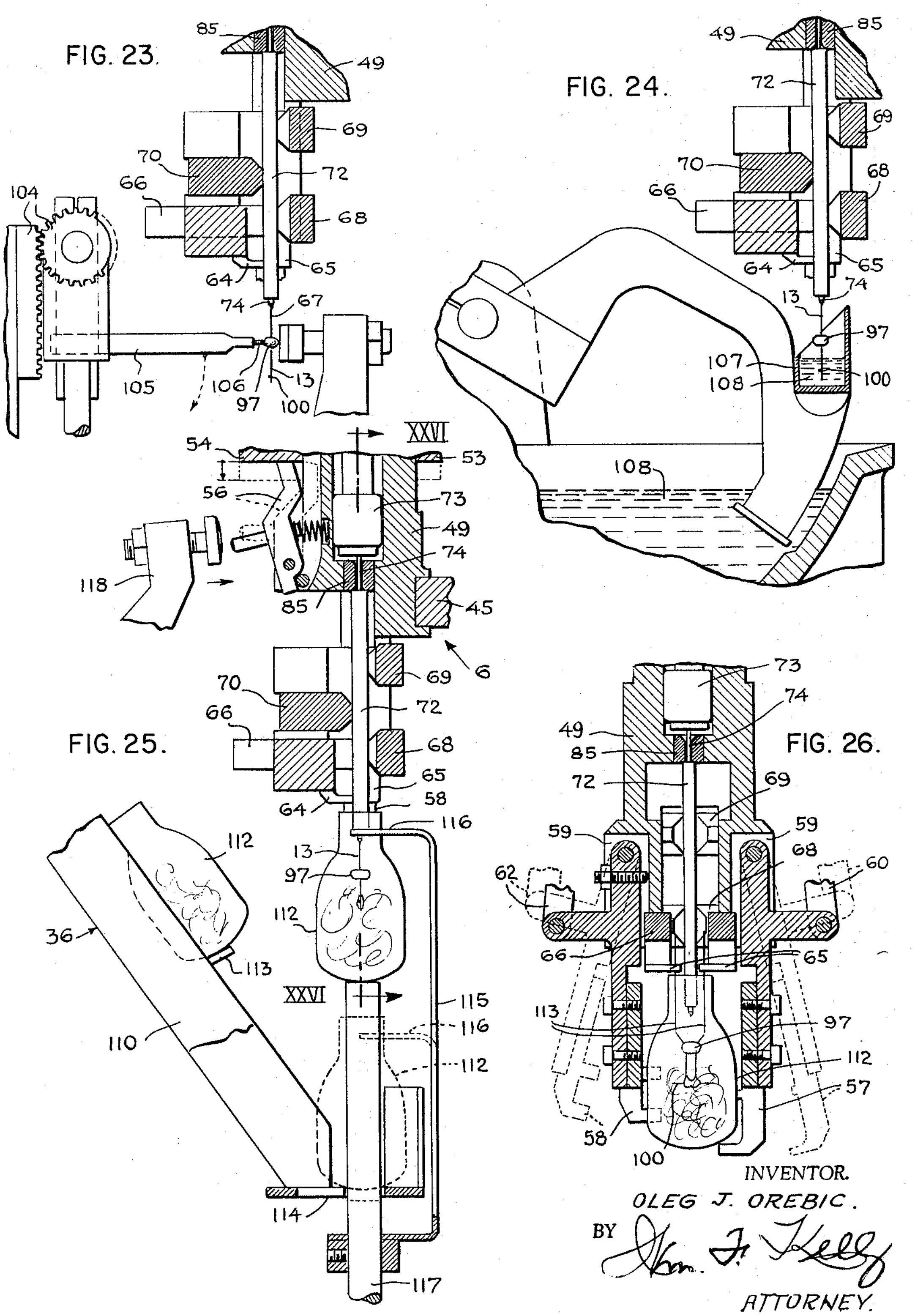
Figures 27, 28, 29, 30, 31:
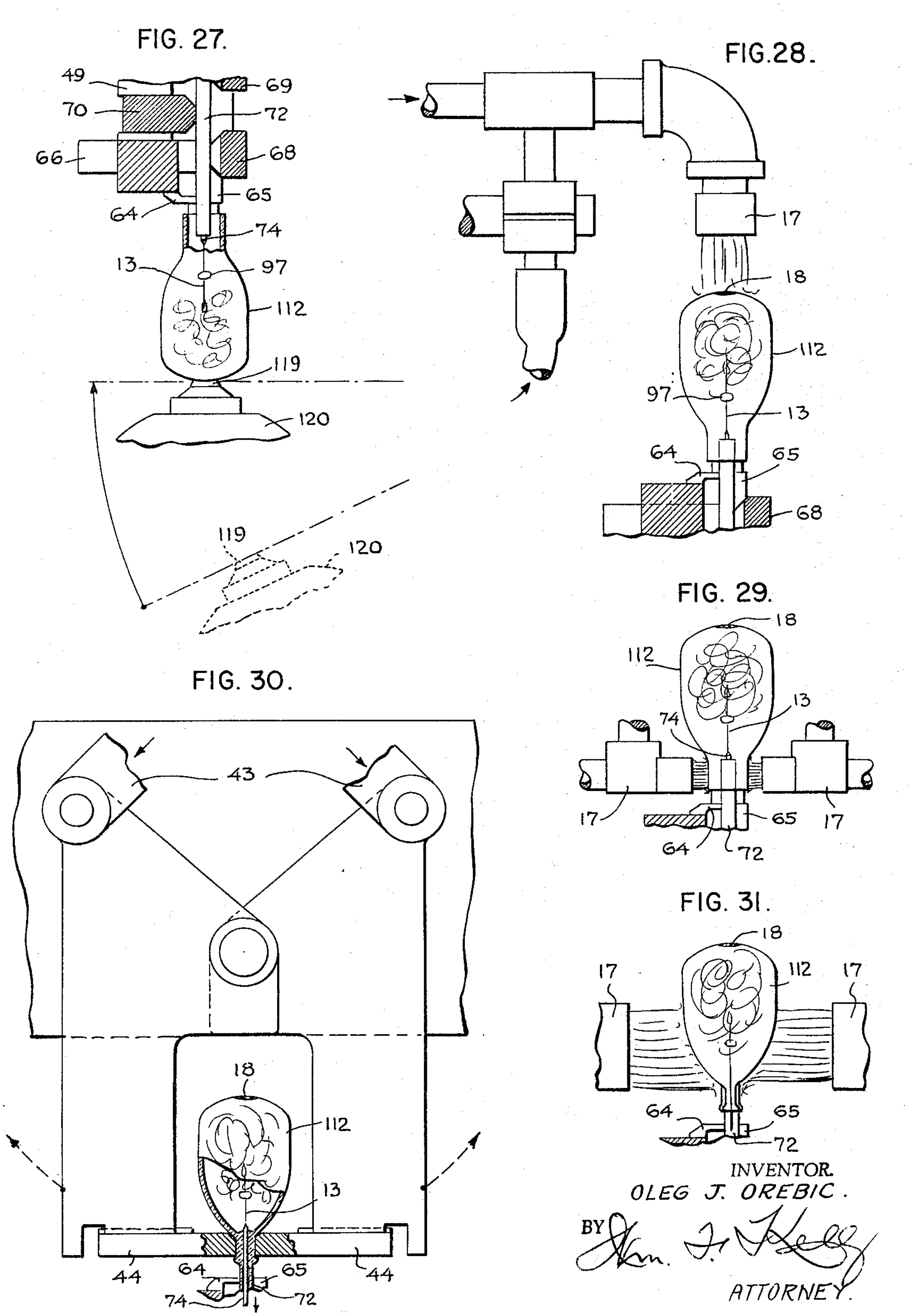

The present invention can be readily understood by reference to the accompanying drawing wherein:

FIGURE 1 is a schematic illustration of the high speed automatic mounting and sealing machine of the present invention wherein the work performed at the various work stations to which each universal mounting and sealing head is intermittently indexed is shown by the various legends, FIGURE 2 is an elevational view of a photoflash lamp of the type manufactured by the high speed automatic mounting and sealing machine of the present invention showing such lamp with its pressed seal prior to tip-off of the exhaust tubulation, FIGURE 3 is a view identical to that of FIG. 2 but taken ninety degrees relative thereto, FIGURE 4 is an elevational view of the completed lamp after its exhaust tubulation has been sealed-off and the base applied to the lamp envelope, FIGURE 5 is a fragmentary elevational view on an enlarged scale of an end of the high speed automatic mounting and sealing machine shown in FIG. 1 with the universal mounting and sealing heads at several work stations, FIGURE 6 is a fragmentary elevational view partly in cross-section taken at right angles to that of FIG. 5 in showing the press fires and press seal work stations of the machine at the top of the head-conveyor and the bulb-feed station at the bottom thereof and thus along the line VI—VI of FIG. 1 and in the direction of the arrows, FIGURE 7 is a fragmentary top plan view showing a portion of the link-chain conveyor together with one of the universal mounting and sealing heads affixed thereto, FIGURE 8 is a front elevational view of the universal mounting and sealing head secured to the link-chain conveyor as shown in FIG. 7, FIGURE 9 is a sectional view taken on the line IX—IX of FIG. 8 and looking in the direction indicated by the arrows, FIGURE 10 is a sectional view taken on the line X—X of FIG. 8 and looking in the direction indicated by the arrows, FIGURE 11 is a sectional view taken on the line XI—XI of FIG. 9 and looking in the direction shown by the arrows, FIGURE 12 is a fragmentary elevational view partly in section of one of the universal mounting and sealing heads at the "lead wire feed" station of the machine, FIGURE 13 is a cross-sectional view taken on the line XIII—XIII of FIG. 12 looking in the directions of the arrows, FIGURE 14 is a view similar to FIG. 13 but showing the universal mounting and sealing head at the "exhaust tube feed" position of the apparatus as seen in FIG. 1, FIGURE 15 is a cross-sectional view taken on the line XV—XV of FIG. 14, FIGURE 16 is a cross-sectional view identical to FIG. 15 except that it shows the exhaust tube clamp in its closed position in the head, FIGURE 17 is a view similar to FIG. 12 and showing a head at the "lead wire former" station together with some of the tooling operable when the head is indexed to such station to bend the lead wires to a desired shape, FIGURE 18 is a view similar to FIG. 17 but showing the universal mounting and sealing head at the "bead feed" station after the lead wires have been properly bent at the preceding "lead wire former" station, FIGURE 19 shows a universal mounting and sealing head with its beaded lead wires at the "bead fires" station, FIGURE 20 is a fragmentary cross-sectional view taken on the line XX—XX of FIG. 19 looking in the direction of the arrows, FIGURE 21 is a fragmentary view partly in section showing a universal mounting and sealing head at its "filament feed" station wherein such head has become inverted from that shown in FIG. 20, FIGURE 22 is a cross-sectional view taken on the line XXII—XXII of FIG. 21 and looking in the direction of the arrows, FIGURE 23 is a fragmentary view partly in cross-section and similar to FIG. 21 but showing a universal mounting and sealing head at its "blue dot applicator" station, FIGURE 24 is a view similar to FIG. 23 but showing the head at the "primer" station of the apparatus, FIGURE 25 is a view similar to FIG. 24 but showing a head at the "bulb loader" station, FIGURE 26 is a cross-sectional view taken on the line XXVI—XXVI of FIG. 25 but showing a lamp envelope after the universal mounting and sealing head has operated to grip such envelope, FIGURE 27 is a fragmentary view similar to FIG. 25 but showing the head in its "monogram stamping" station, FIGURE 28 is a fragmentary view showing a monogrammed lamp envelope at the "monogram baking fires" station wherein the conveyor has carried the head to the top of the machine and simultaneously inverted the monogrammed envelope held by the head, FIGURE 29 is a fragmentary view similar to FIG. 28 but showing a lamp at the "1st press fires" station of the machine where the press portion of the envelope is heated by the fires, FIGURE 30 is a view somewhat similar to FIG. 29 but showing the heated envelope carried by the head at the "2nd press fires" station and with the press jaws closed to seal the envelope, and FIGURE 31 is a view similar to that of FIGS. 29 and 30 except it shows the lamp envelope at its "annealing fires" station.

Referring now more specifically to the drawings the high speed automatic mounting and sealing machine as shown therein comprises an endless conveyor in the form of a link-chain 5 disposed in a vertical plane and provided with a plurality of universal mounting and sealing heads 6 shown in FIG. 1 as being one hundred fifteen (115) in number. This conveyor 5 passes around a pair of sprockets 7 disposed at opposite ends of the machine which are intermittently rotated by a suitable camshaft 8 (FIGS. 5 and 6) in turn driven by a prime mover such as an electric motor 9 through a belt or the like 10. Accordingly upon intermittent rotation of the sprockets 7 the conveyor 5 is moved to index the respective heads 6 successively into the various work stations where work is performed as indicated by the legends in FIG. 1. Since the mounting and sealing machine as herein shown was designed primarily for the manufacture of photoflash lamps 12, such as shown in FIGS. 2 through 4, inclusive, the various work stations as shown by the legends in FIG. 1 refer to manufacturing operations necessarily performed in the production of lamps of this type. However, the present machine is equally applicable to electric lamps of other types.

By reference particularly to FIG. 1 it will be noted that in the manufacture of these photoflash lamps 12 the various parts are first supplied to the heads 6 beginning with the feeding of the lead-wires 13 at "station 4." Other parts are fed and their presence or absence detected as the heads 6 pass around the sprocket 7 in a counter-clockwise direction at the left-hand end of the machine and across the bottom as the conveyor 5 continues in its horizontal path of movement. When all the required parts for the lamp 12 have been supplied the heads 6 then pass around the sprocket 7 at the right-hand end of the machine again in a counter-clockwise direction and continue in a horizontal path across the top of the machine. During this latter movement all the fabricating operations which require heating fires to complete the lamp are actually performed above the machine with the flame from the fires thus impinging directly upon the lamp. By so confining the flames the dissipated heat rises away from the machine with the result that all movable metallic parts remain at room temperature. This accordingly eliminates contraction and expansion of the metallic parts with attendant misalignment and change of dimensions therebetween which has heretofore not only necessitated stoppage of the machine with attendant increased manufacture costs, but has been also conducive to the production of defective products.

This can be more fully appreciated by particular reference now to FIGS. 5 and 6 wherein FIG. 5 shows the right-hand end of the machine on an enlarged scale together with the universal mounting and sealing heads 6 at their "bulb loader," "monogram stamping," and one of the several "monogram baking," work stations. Also, as can be seen in FIG. 5, a plurality of pipe lines 14 are secured to suitable supports 11 and extend horizontally across the top of the machine from work "station 85" to "station 16" (FIG. 1) which pipe lines 14 carry gas, air and oxygen that can be mixed and delivered to the several work stations, as indicated in FIG. 1. Although the "monogram baking" operation extends from "station 85" to "station 88" (FIG 1) only one such station is shown in FIG. 5 for purposes of illustration. However, at each of these "stations" the air and gas lines 14 are connected by suitable valves 15 and short conduits 16 to a burner 17 which directs a flame downwardly on the monogram 18 applied to the top of the lamp 12 at the preceding "monogram stamping" "station 70," as can be seen in FIG. 27. Accordingly, after passing intermittently through all of the four "monogram baking" stations such monogram 18 is thoroughly baked to form a permanent indicia on the lamp 12.

At each station where work is to be performed it is essential that the indexed heads 6 be maintained very accurately in their proper vertical position, since they are slightly pivotal about an axis, as hereinafter pointed out more in detail. To assure such vertical alignment a pair of slide-bars 19 and 20 (FIG. 5) are reciprocally movable longitudinally of the machine in opposite directions by oscillatory movement of a cam-operated lever 22 in turn operated by rotation of camshaft 8. A rocker arm 23 is pivotally connected to the machine frame 24 adjacent each station where work is to be performed and so disposed that a projecting pin 25 carried by the slide-bars 19 and 20 contact one end of the rocker-arm 23. This accordingly causes rotation of the rocker-arm 23 about its pivot with the opposite end thereof contacting an adjustment screw 26 (FIGS. 7 and 9) carried by the heads 6 to hold the latter in accurate alignment in a vertical plane and thus always in proper position with respect to the "tooling" disposed at each respective work station.

By reference now more particularly to FIG. 6 it will be seen that the pedestal supports 27 carry a horizontally disposed supporting plate 28 which in turn is provided with spaced vertical barckets 29 having bifurcated ends. A pair of tracks 30 spaced in a horizontal plane are affixed to the inner surface of the bifurcated ends of the brackets 29 and substantially midway between such tracks 30 but in a lower plane is a track 32 carried by the supporting plate 28. These tracks 30 and 32 extend substantially the entire length of the machine and are engaged by rollers 33 (FIGS. 7 and 9) carried by the links of the chain conveyor 5 for the purpose of guiding the latter through its desired upper and lower horizontal paths to acurately dispose the heads 6 in their proper position with respect to the "tooling" at the various work stations since this engagement of the rollers 33 with the tracks 30 and 32 prevent both transverse and vertical displacement of the heads 6.

Also as shown particularly in FIG. 6, the pedestal support 27 is provided with a bracket arm 34 which supports an air-cylinder 35 and a bulb chute 36 at the "bulb loader" position for delivering bulbs (FIG. 25) to the head 6, as hereinafter referred to more in detail. The "1st Press Fires" position of the head 6, and constituting "station 90," as well as the mechanism for the "1st Press" at "station 95" (FIG. 1) is also shown in FIG. 6 wherein it will be noted that in this instance the burners 17 direct their hot flames horizontally in opposite directions onto the neck portion of the lamp 12 (FIG. 29) which continues as the lamp is carried by the head 6 from "station 90" through "station 94." Upon the head 6 carrying the lamp 12 with its heated neck indexing into "station 95," a cam 37 will have been rotated by the camshaft 8 thereby moving a cam-lever 38 about its pivot against the tension of a coil spring 39.

Inasmuch as this cam-lever 38 is connected to a push-rod 40 the latter is raised and in turn causes counterclockwise rotation of a rocker-arm 42 connected to the upper end of the push-rod 40. The rocker-arm 42 is pivotally connected to a pair of links 43 extending to a pair of pivoted jaws 44 (FIG. 30) so that downward pressure by rocker-arm 42 causes similar pressure on the links 43. Attendant movement of the jaws 44 about their pivots accordingly follows, causing the jaws 44 to close upon the heated neck of the lamp 12 to form a "1st Press" at "station 95," such as shown in FIG. 30.

Referring now more specifically to FIGS. 7 to 11, inclusive, it will be noted that the heads 6 comprise an inverted U-shaped bracket 45 having one leg pivotally connected for limited movement to the link of the chain conveyor 5. A coil spring 46 normally biases a pin 47 carried by such bracket 45 against an adjustable stop-screw 48 but such bracket is moved against the tension of the coil-spring 46 to always properly align the head 6 with the "tooling" at each work station by contact of the rocker-arm 23 with the adjustment screw 26 upon movement of the slide-bars 19 and 20, as previously herein mentioned. The outer leg of the bracket 45 has a hollow sleeve 49 affixed thereto, as by screws or the like 50 (FIG. 9), and secured to such sleeve at the bottom thereof is a fixed flange 52.

An elongated collar 53 having a flanged upper end 54 in turn surrounds the hollow sleeve 49 and is normally urged longitudinally of the latter by a coil-spring 55 but is held in a fixed position with this coil-spring 55 compressed by means of a pivoted spring-pressed latch 56 (FIG. 9) engaging the upper flanged end 54 at various times, as hereinafter mentioned more in detail. A pair of gripping fingers 57 and 58 are pivotally connected to the upper end of the hollow sleeve 49 and in their closed lamp-holding position, as seen in FIG. 26, the lower ends of such fingers nestle in longitudinally extending diametrically opposite grooves 59 at the end of the sleeve 49. A pair of pivoted links 60 and 62 connect the gripping fingers 57 and 58 with the flanged end 54 of the elongated collar 53 with the link 60 being telescopic but normally held at its desired length by a compression spring 63. Accordingly, upon downward movement of the elongated collar 53 with its flanged end 54 relative to the sleeve 49 and compression of the coil-spring 55 by the latch 56, the gripping fingers 57 and 58 will be rotated about their pivots and held in their open position, as shown particularly in FIGS. 8 and 11.

The upper end of the hollow sleeve 49 is provided with a pair of horizontally spaced fixed jaws 64 which are normally engaged by spring-pressed movable jaws 65 with the latter having operating contact arms 66 for the purpose of holding the lead-wires 67 for the lamp 12 in proper position within the head 6. Such sleeve 49 also adjacent its upper end is provided with a pair of interiorly disposed longitudinally spaced grooved blocks 68 and 69 and a spring-pressed contact bar 70 is diametrically disposed therebetween for the purpose of holding the exhaust tubulation 72 of the lamp 12 in proper alignment. Interiorly of the hollow sleeve 49 is a reciprocally movable plunger or the like 73 having a fine threading-needle end 74 coaxially disposed relative to the axis of the sleeve 49 and hence the head 6. The upper extremity of the needle end 74 is movable above the jaws 64 and 65 and between the gripping fingers 57 and 58 and held in such position by the engagement of a collar 75 on the outer end of the plunger 73 with a spring clip 76, for the purpose of receiving the exhaust tubulation 72 when the head 6 is indexed into the "exhaust tube loader" station "6" (FIG. 1), as hereinafter described more in detail.

When a head 6 with its open gripping fingers 57 and 58 is indexed into its first production "lead wire feed" station "4" (FIG. 1) a cam-operated contact 77 (FIG. 13) engages the operating contact arms 66 thereby separating the spring-pressed movable jaws 65 from the fixed jaws 64. Immediately thereafter a pair of independent slides 78 and 79 (FIG. 12) reciprocate downwardly carrying with them the free ends of wire feeding from spools (not shown) which wire is fed through suitable guiding dies 80 a predetermined distance between the open pairs of jaws 64–65. The cam-operated contact 77 then moves away from the contact arms 66 allowing the spring-pressed movable jaws 65 to close and clamps the wire ends against the fixed jaws 64. At the same time the slides 78 and 79 move away from the head 6 and slide along the wires until at the appropriate time a cutter 81 (FIG. 13) reciprocates across the face of slide 78 to shear off the wires to thus form the lamp lead-in wires 67 of preselected length firmly held in the head 6 by the jaws 64–65.

After passing through the indexed "lead wire detector" station, the head 6 with its clamped lead-wire 67 indexes into the "exh. tube loader" station "6" of FIG. 1. Upon arrival at such work station a cam operated contact 82 (FIG. 15) engages the spring-pressed contact bar 70 to move it away from the grooved blocks 68 and 69. Also a cam-operated exhaust tube feeder 83 (FIG. 14) rotates about its pivot and positions an exhaust tube 72 in axial alignment with the needle end 74 of the plunger 73 which is then protruding above the jaws 64–65 centrally therebetween since the collar 75 is latched by the spring-clip 76. At about the time the exhaust tube 72 begins to pass around the needle-end 74 a roller 84 contacts the head 6 (FIG. 14) releasing the exhaust tube 72 from the feeder 83 and allowing it to gravitate completely over the needle-end 74 until the lower end thereof rests on a bearing 85 disposed interiorly of the hollow sleeve 49. When the exhaust tube 72 reaches such position the cam-operated contact 82 moves away from the spring pressed contact bar 70 allowing the latter to rotate about its pivot until its inner face engages the exhaust tube 72 thereby holding the latter under pressure firmly in the spaced grooved blocks 68 and 69 and hence coaxially of the head 6, as can be appreciated from FIG. 16.

The head 6 then indexes into the "exh. tube push down" station "7" of FIG. 1 where the exhaust tube 72 is engaged by a plunger (not shown) to push the latter downwardly on the needle-end 74 and into contact with the bearing 85 in case it had not completely gravitated thereto at the previous work station "6." Upon the head 6 next indexing into the "lead wire former" station "8" the lead wires 13 held by the jaws 64–65 will be protruding upwardly therefrom, as seen in FIG. 17. At this station "8" a forming die 86 is positioned between the lead wires 67 a predetermined distance above the jaws 64–65 and hence spaced from the extremity of the exhaust tube 72. Thereupon a pair of reciprocating die-members 87 move toward each other to force each lead-wire 67 against the forming die 86 to bend the latter so that the upper portions thereof are thereby spaced closer to each other and a shoulder 88 (FIG. 19) is formed, followed by opposite movement of the die-members 87. At indexed station "9" the head 6 with its partially fabricated lamp stem is "detected" to assure the presence of the exhaust tube 72 after which the head indexes onto the "bead feed" station "10."

When the head 6 arrives at this station "10" it is axially aligned and orientated by operation of bars 19 and 20 and the rocker-arms 23, as previously mentioned, which thus positions the bent lead-wires 13 immediately below a guide rod 89 (FIG. 18). The upper end of this guide rod 89 is provided with a plurality of vitreous collars 90 that are prevented from gravitating downwardly until desired by means of a pair of normally closed reciprocally movable fingers 92. A pair of normally closed clamps 93 engage an elongated recess 94 in the guide rod 89 and are simultaneously reciprocal into and out of engagement with this rod 89 along with movement of the fingers 92 into and out of engagement with the collars 90. Likewise a further pair of normally open reciprocally movable clamps 95 are operable to engage a recess 96 in the rod 89 just prior to opening of the fingers 92 and clamp 93.

Accordingly, upon arrival of the head 6 at station "10" the "tooling" thereat will be in the position as shown in FIG. 18 with one of the vitreous collars 90 resting on the normally closed clamps 93 and others held in a stacked position on the guide rod 89 by the normally closed fingers 92. Thereupon the open clamps 95 will close followed imediately by the simultaneous opening of the clamps 93 and fingers 92. The collar 90 which had been resting on the clamps 93 then gravitates downwardly on the guide-rod 89 and the upwardly projecting lead-wire 13 until it comes to rest on the shoulder 88, as shown by the dotted lines in FIG. 18. At the same time the stack of collars will gravitate downwardly until the bottom collar 90 comes to rest on top of the now-closed clamps 95 which are spaced from the fingers 92 a distance corresponding to the thickness of one collar 90. The fingers 92 and clamps 93 then again close followed by opening of the clamps 95 thus allowing the lowermost collar 90 previously resting on the clamps 95 to gravitate downwardly until it comes to rest on top of the closed clamps 93 while the fingers 92 retain the remaining collars 90 in stacked position preparatory to the indexing of the next head 6 into this "bead feed" station "10."

At the next indexed "bead fires" stations "11" to "16" of FIG. 1 the collar 90 is subjected to heating fires from burners 17 (FIGS. 19 and 20) until such collar is completely melted about the lead-wires 13 to form the customary insulating bead 97, as shown in the finished lamp of FIG. 4. The head 6 then indexes through several stations where the bead 97 is cooled as the conveyor 5 carries the head about the periphery of one of the sprockets 7 at one end of the machine until it reaches its lower horizontal path of movement. After indexing through a conventional "bead deetctor" station "27" and a "lead-wire straightener" station "28," the head 6 is indexed into a "filament feed" station "30," as shown in FIG. 1. At this latter station "30" the exhaust tubulation 72, together with the lead wires 13 separated by their insulating bead 97 depending from the head 6, are positioned adjacent filament mounting "tooling," such as shown in Letters Patent, Patent No. 2,877,806, granted March 17, 1959, to O. J. Moehler and assigned to the same assignee as the present invention. Since such "tooling" per se forms no part of the present invention a detailed description herein is deemed unnecessary.

Suffice it to say that at such station "30" filament wire gripping jaws 98 and 99 hold the filament wire 100 taut at the section thereof being presented to the depending lead wires 13, as shown in FIGS. 21 and 22. These jaws 98 and 99 move laterally from their full line position to that shown by the dotted lines in these latter figures after which a hammer 102 moves upwardly and thereafter strikes the filament-wire 100 to embed it in the lead-wires 13 which are rigidly held against an anvil 103. Thereafter the head 6 indexes further along its lower horizontal path until it reaches a "blue dot applicator" station "41," as shown in FIG. 23. Here the adjacent "tooling" comprises a rack-bar and pinion arrangement 104 which is operable to cause an arm 105 to swing upwardly so that the outer extremity 106 thereof applies a chemical preparation to the bead 97 which changes from a blue-dot to another color should the finished lamp become subsequently defective, as well known in the art.

At a further indexed "filament detector" station "43" the absence of a filament 100 is detected so as to eject the defective stem prior to further processing after which such head indexes into the "primer" station "45." Here the depending end of the lead-wires 13 together with the filament 100 secured thereto are immersed into a reservoir 107 containing the customary priming material 108 for igniting the flash of finished photoflash lamp 12. Thereafter the head 6 with its stem comprising the exhaust tube 72, primer-coated lead-wires 13 and filament 100, indexes through a plurality of drying stations to solidify the primer 108 and then reaches its "bulb loader" station "67," as shown in FIGS. 5, 6, 25 and 26, with the fingers 57 and 58 still in their open position as seen in FIGS. 8 and 11.

The "tooling" at this "bulb loader" station comprises a chute 110, down which the vitreous envelopes 112 gravitate, upon release of an escapement finger 113, onto a platform 114 where it is held in a vertical position by a lifting plate 115 having a resilient bifurcated upper end 116. This plate 115 is connected to a cam-operated plunger 117 (FIG. 25) which upon raising passes through an opening provided in the platform 114 and carries with it the vitreous envelope 112 held by the resilient bifurcated end 116 of the lifting plate 115. At the upper limit of raising the envelope 112 will thus enclose the assembled stem as held by the head 6 whereupon a cam-operated arm 118 engages the head latch 56 to cause disengagement thereof with the flanged end 54 of the elongated collar 53. The compressed coil spring 55 accordingly expands causing the collar 53 to move longitudinally of the sleeve 49 and since the links 62 and 63 are connected to the flanged end 54 of the collar 53, the fingers 57 and 58 are rotated about their pivots from the dotted-line position as shown in FIG. 26 to their full line position where they grip the envelope 112 and hold it in proper position relative to the enclosed depending stem.

Following the loading of the envelope 112 in the head 6 the latter indexes through a "bulb detector" station "68" and into its "monogram stamping" station "70." The "tooling" at this particular station comprises a suitable stamp 119 affixed to a cam-operated arm 120 which rotates this stamp into contact with the lower end of the envelope 112 to apply a monogram thereto with a suitable ink which produces substantially an etching after proper drying and baking. Since the remaining lamp-fabricating steps now require heating, in accordance with the present invention as hereinbefore mentioned no further operations are performed along the lower horizontal path of movement of the conveyor 5. Consequently, the head 6 carrying the monogram-stamped envelope 112 surrounding the fabricated stem then passes around the periphery of the sprocket gear 7, at the right-hand end of the machine as seen in FIG. 1, until it indexes into the "monogram baking fires" stations "85" to "88." At these several stations the envelope 112 with its stamped monogram 18 affixed thereto is subjected to a heating flame for drying and baking the monogram as previously herein described relative to FIGS. 5, 6 and 28.

Next the head 6 indexes into the "1st press fires" stations "90" to "94" where the neck portion of the envelope 112 is subjected to a hot air-oxygen flame from burners 17, as shown in FIGS. 6 and 29, sufficient to soften such neck portion. In this condition the head 6 then indexes the envelope 112 into the "1st press" station "95" where the pivoted jaws 44 (FIG. 30) are closed to compress the softened neck inwardly and from a first press as hereinbefore described. It is to be noted, however, that at this particular station "95" the exhaust tube 72 is not collapsed by the jaws 44 because the plunger 73 with its needle-end 74 is still disposed interiorly of such exhaust tube 72. Following this initial pressing of the softened neck the head 6 is then indexed into "2nd press fires" stations "96" to "100" where the originally pressed neck portion of the envelope 112 is again heated by a hot air oxygen flame from additional burners 17 (FIG. 29) to raise the temperature of such pressed neck portion to the softening point. In this heat-softened condition the head 6 then indexes the envelope into the "2nd press and withdrawal of exh. tube needle" station "101." At this latter station the jaws 44 (FIG. 30) again close upon the heat-softened neck of the envelope 112 to complete pressing thereof after which a cam or the like operates to pull the collar 75 away from spring clip 76 (FIG. 8). Such pull also moves the plunger 73 longitudinally downward thereby withdrawing the needle-end 74 from the exhaust tube 72 protruding into the envelope 112 while leaving the exhaust tube open so that the pressed envelope as seen in FIGS. 2, 3 and 31 can be subsequently exhausted and gas-filled on an exhaust machine.

Following this final press at station "101" the head 6 is indexed through "annealing fires" stations "102" to "114" where the pressed envelope 112 is subjected to gas-air flames from the burners 17 (FIG. 31) to anneal the envelope and remove all strains therefrom. Thereafter the head 6 is indexed into the final "unloading conveyor" station "115" from which the pressed envelope 112 with its exteriorly projecting exhaust tube 72 is removed, by again opening the fingers 57 and 58, and such envelope transported by a suitable conveyor to a conventional exhaust machine.

It should thus be apparent to those skilled in the art from the foregoing that a high speed automatic mounting and sealing machine has been provided by the present invention wherein the work-holding heads are indexed to numerous stations provided with adjacent tooling and in which these work-holding heads are movable by a conveyor in a vertical plane. Moreover, during their movement these work-holding heads travel across an upper and lower horizontal path with all work stations employing application of heat for both mounting and sealing operations being confined to the upper horizontal path. By thus disposing the heating fires at these work stations so that they are directed entirely to the partially fabricated lamp, which themselves are held above the metallic parts of the machine, such metallic parts remain substantially at room temperature. This accordingly eliminates the possibility of contraction and expansion which might otherwise cause a deviation from desired dimensions and positioning during fabrication of the lamp resulting in a defective salvage product.

Although one embodiment of the present invention has been herein shown and described it is to be understood that still further modifications thereof may be made without departing from the spirit and scope of the invention.

I claim as my invention:

1. A high speed automatic mounting and sealing machine for the manufacture of electric lamps comprising the combination of:

(a) a conveyor movable in a vertical plane and along an upper and lower horizontal path, (b) a plurality of spaced work-holding heads carried by said conveyor for supporting various lamp-making parts while the electric lamp is being progressively fabricated, (c) a plurality of work stations adjacent the upper and lower horizontal path of movement of said work-holding heads on said conveyor and provided with various tooling at certain of such stations operable to supply lamp-making parts to said heads to form a mount and operable at certain of those stations disposed adjacent the upper horizontal path of movement of said heads to heat seal such parts and form an assembled electric lamp preparatory to evacuation thereof.

2. A high speed automatic mounting and sealing machine for the manufacture of electric lamps comprising the combination of:

(a) an endless conveyor intermittently movable in a vertical plane and along an upper and a lower horizontal path after passing about a rotating drive member adjacent each end of said machine, (b) a plurality of spaced work-holding heads carried by said conveyor for supporting various lamp-making parts while the electric lamp is being progressively fabricated, (c) a plurality of work stations adjacent the upper and lower horizontal path of movement of said work-holding heads on said conveyor and provided with various tooling at certain of such stations operable to supply lamp-making parts to said heads to form a mount and operable at certain of those stations disposed adjacent the upper horizontal path of movement of said heads to heat seal such parts and form an assembled electric lamp preparatory to evacuation thereof.

3. A high speed automatic mounting and sealing machine for the manufacture of electric lamps comprising the combination of:

(a) a conveyor movable in a vertical plane and along an upper and lower horizontal path, (b) a plurality of spaced work-holding heads secured to said conveyor and projecting perpendicular thereto for supporting various lamp-making parts in a substantial spaced relation from said conveyor as the electric lamp is being progressively fabricated, (c) a plurality of work stations adjacent the upper and lower horizontal path of movement of said work-holding heads on said conveyor and provided with various tooling at certain of such stations operable to supply lamp-making parts to said heads to form a mount and operable at certain of those stations disposed adjacent the upper horizontal path of movement of said heads to heat seal such parts and form an assembled electric lamp preparatory to evacuation thereof.

4. A high speed automatic mounting and sealing machine for the manufacture of electric lamps comprising the combination of:

(a) a conveyor movable in a vertical plane and along upper and lower horizontal path, (b) a plurality of spaced work-holding heads carried by said conveyor for supporting vairous lamp-making parts while the electric lamp is being progressively fabricated, (c) a plurality of work stations adjacent the upper and lower horizontal path of movement of said work-holding heads and provided with various tooling at certain of such stations operable to supply lamp-making parts to said heads to form a mount and all those stations having fires as the tooling for heating sealing the lamp parts being disposed adjacent the top of said machine in the path of the heads carried by said conveyor during movement along its upper horizontal path to cause rising of the excess heat away from said machine during the formation of an assembled electric lamp preparatory to evacuation thereof.

5. A high speed automatic mounting and sealing machine for the manufacture of electric lamps comprising the combination of:

(a) an endless conveyor intermittently movable in a vertical plane and along an upper and a lower horizontal path after passing about a rotating drive member adjacent each end of said machine, (b) a plurality of spaced work-holding heads secured to said conveyor and projecting perpendicular thereto for supporting various lamp-making parts in a substantial spaced relation from said conveyor as the electric lamp is being progressively fabricated, (c) a plurality of work stations adjacent the upper and lower horizontal path of movement of said work-holding heads and provided with various tooling at certain of such stations operable to supply lamp-making parts to said heads to form a mount and all those stations having fires as the tooling for heat sealing the lamp parts being disposed adjacent the top of said machine in the path of the heads carried by said conveyor during movement along its upper horizontal path to cause rising of the excess heat away from said machine during the formation of an assembled electric lamp preparatory to evacuation thereof.

6. A high speed automatic mounting and sealing machine for the manufacture of electric lamps comprising the combination of:

(a) an endless conveyor intermittently movable in a vertical plane and along an upper and lower horizontal path, (b) a plurality of spaced work-holding heads carried by said conveyor for supporting various lamp-making parts while the electric lamp is being progressively fabricated, (c) a plurality of work stations adjacent the upper and lower horizontal path of movement of said conveyor and into which said heads are indexable by the intermittent movement of said conveyor, said work stations being provided with various tooling at certain of such stations operable to supply lamp-making parts to said heads to form a mount and operable at certain of those stations disposed adjacent the upper horizontal path of movement of said heads to heat seal such parts and form an assembled electric lamp preparatory to evacuation thereof, and (d) means carried by said machine and movable into contact with said heads when indexed into said work stations to accurately align said heads vertically with the tooling at each such work station.

7. A high speed automatic mounting and sealing machine for the manufacture of electric lamps comprising the combination of:

(a) an endless conveyor intermittently movable in a vertical plane and along an upper and a lower horizontal path after pasisng about a rotating drive member adjacent each end of said machine, (b) a plurality of spaced work-holding heads secured to said conveyor and projecting perpendicular thereto for supporting various lamp-making parts in a substantial spaced relation from said conveyor as the electric lamp is being progressively fabricated, (c) a plurality of work stations adjacent the upper and lower horizontal path of movement of said work-holding heads and provided with various tooling at certain of such stations operable to supply lamp-making parts to said heads to form a mount and all those stations having fires as the tooling for heat sealing the lamp parts being disposed adjacent the top of said machine in the path of the heads carried by said conveyor during movement along its upper horizontal path to cause rising of the excess heat away from said machine during the formation of an assembled electric lamp preparatory to evacuation thereof, and (d) means carried by said machine and movable into contact with said heads when indexed into said work stations to accurately align said heads vertically with the tooling at each such work station.

No references cited.

RICHARD H. EANES, Jr., *Primary Examiner.*